Dec. 13, 1960     E. T. RIDGWAY ET AL     2,963,903
TESTING OF VEHICLES, ESPECIALLY OF SEMI-TRAILERS
Filed Dec. 15, 1955     2 Sheets-Sheet 1

INVENTORS
Edmund T. Ridgway
Henry W. Weisheit, Jr.
BY
AGENT

Dec. 13, 1960     E. T. RIDGWAY ET AL     2,963,903
TESTING OF VEHICLES, ESPECIALLY OF SEMI-TRAILERS
Filed Dec. 15, 1955     2 Sheets-Sheet 2
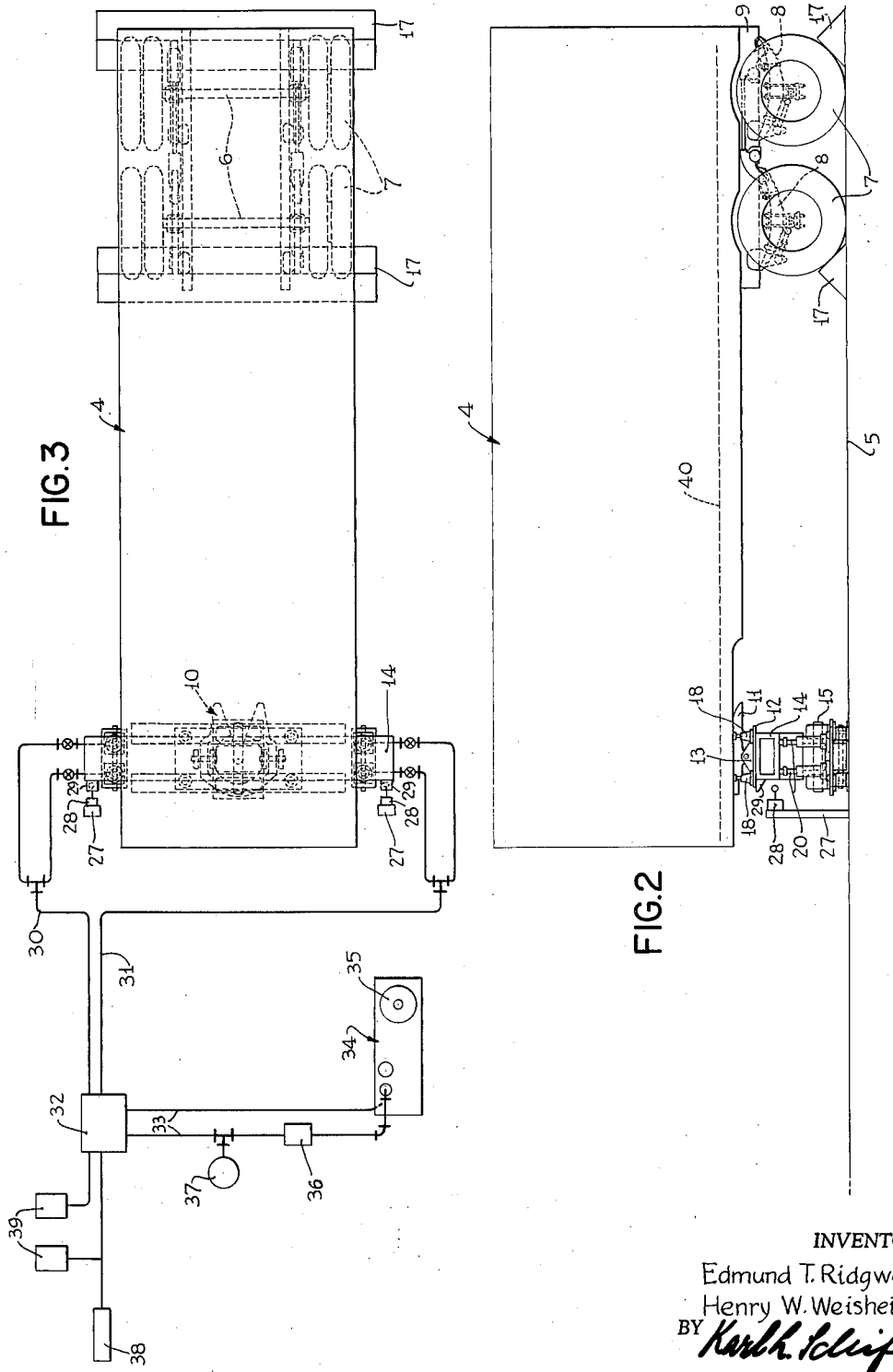
INVENTORS
Edmund T. Ridgway
Henry W. Weisheit, Jr.
BY 
AGENT

United States Patent Office 2,963,903
Patented Dec. 13, 1960

2,963,903

TESTING OF VEHICLES, ESPECIALLY OF SEMI-TRAILERS

Edmund T. Ridgway, Oaklyn, N.J., and Henry W. Weisheit, Jr., Rosemont, Pa., assignors to The Budd Company, Philadelphia, Pa., a corporation of Pennsylvania Filed Dec. 15, 1955, Ser. No. 553,384

1 Claim. (Cl. 73—71.7)

The invention relates to novel, simple and effective means and procedures for structurally testing the strength and the durability of the bodies of trailers and other large road vehicles, such as trucks.

In the past this information was obtained gradually by actual use. Weak spots were overcome in changing the design of trailers already in production after they had become apparent in previously produced trailers of the same general type.

For an entirely new design of a trailer or other large vehicle, it is highly desirable to obtain quickly and in advance of starting production information about possible weak spots and to compare its behavior and characteristics with earlier, time-tested constructions and with existing, possibly competing constructions.

The novel testing consists in loading the trailer, support its rear end on rear wheels, and subject its front end support to forceful oscillatory forces about a longitudinal axis. More specifically, the trailer is engaged at two transversely spaced corners near its front by jacks, and the jacks are alternately raised and lowered. This twisting of the trailer was found to result in stresses very similar to the stresses to which the trailer or vehicle is subjected while traveling fully loaded on a road.

The accuracy of the testing is proved by the fact that the results obtained in subjecting to the new testing one old-type trailer were very similar to the results obtained through long-time highway use of the same type of trailer.

The new testing is much simpler and requires much less power than if it were attempted to simulate travel over bumpy roads by moving the rear wheel suspension points alone or together with the front end of the trailer to be tested. At the same time, evidence shows that the results of the new simple testing system are as conclusive as more complicated testing systems could be.

The above and other objects, advantages, and features of the invention will be more clearly understood from and are more fully explained in connection with the description of an embodiment and its illustration in the attached drawing.

In the drawing:

Fig. 2 is a diagrammatic side elevation of trailer and testing equipment substantially as viewed in the direction of arrows 2—2 in Fig. 1; and Fig. 3 is a diagrammatic plan view of trailer, testing equipment, and of hydraulic and electrical installations for imparting the test impulses.

Figure 1:
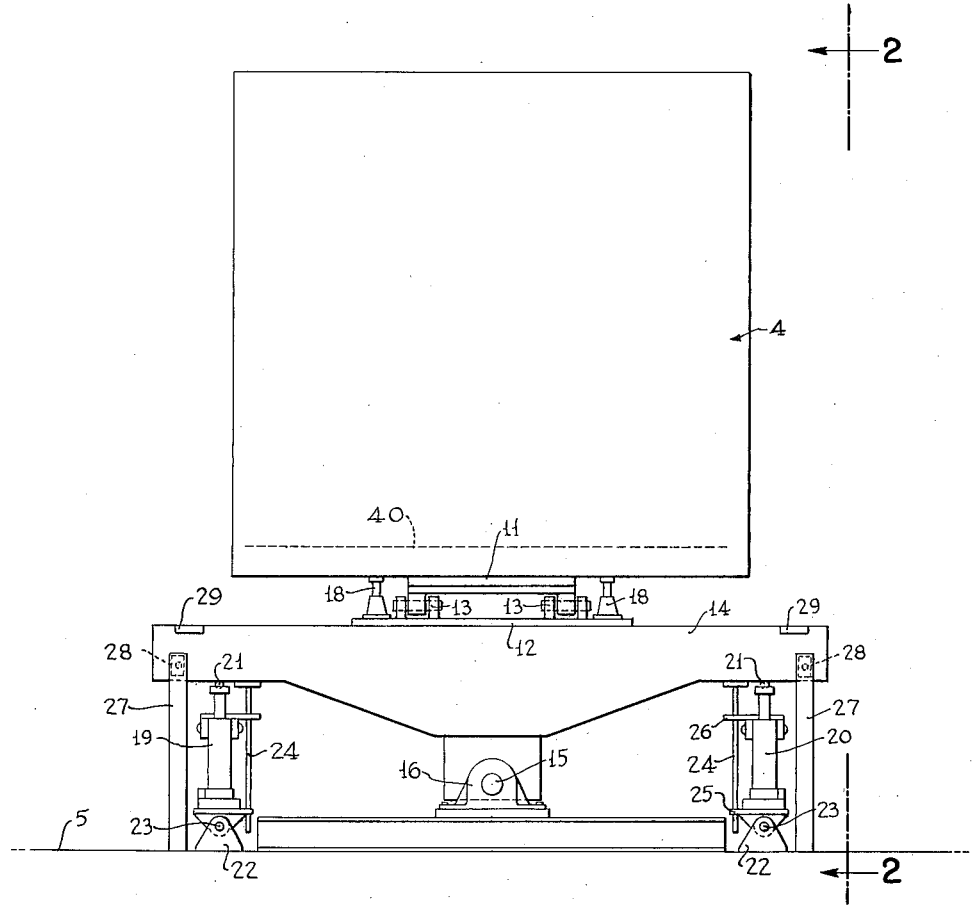
Fig. 1 is a diagrammatic front elevation of a trailer and of essential parts of the testing equipment.

The diagrammatically illustrated semi-trailer 4 is supported at the rear on floor 5 by a pair of rear axles 6 and wheels 7 in tandem arrangement with the help of springs 8 attached to rear underframe 9. The front end of trailer 4 is provided with the customary fifth wheel (hidden from view), which is engaged and supported by mating fifth wheel 10 of the type customarily secured on a tractor for hauling trailers. Fifth wheel 10 comprises a trailer engaging plate 11, a tractor mounting plate 12, and journal connections 13 between plates 11, 12.

Mounting plate 12 is secured centrally on top of beam 14 which extends transversely to the longitudinal direction of trailer 4 and is supported swingably about pivot 15 by stationary bearing 16. Bearing 16 is rigidly secured to floor 5.

So as to impart stresses on the trailer body to be tested without waste in overcoming the play at different locations, the rear wheels 7 are restrained from moving by wedge bars 17 and four small jacks 18 eliminate play between the plates 11, 12 of fifth wheel 10. For the same purpose movement of the rear end may be restricted or eliminated by inserting blocks (not shown) between springs 8 and frame 9 or by tying springs 8 and frame 9 together. The means of restricting the movement of these springs depends upon the type of springs used and will be different for instance in the case of the illustrated longitudinal leaf springs 8 than in the case of (not shown) torsion bar springs.

Powerful hydraulic jacks 19 and 20 are inserted between ground 5 and opposite ends of beam 14. The heads of the jacks engage the underside of the beam 14 by means of ball bearings 21 permitting the necessary relative angular movement between jacks and beam. Jacks 19, 20 are supported on swivel pedestals 22 journaled at 23 about axes paralleling center pivot 15. Disengagement between beam 14 and jacks 19, 20 and the toppling over of the jacks is prevented by guide rods 24 secured to beam 14 and slidably passing through openings (not shown) in members 25, 26 of pedestals 22 and lower part of the jacks, respectively.

Uprights 27 each carry a limit switch 28 arranged in the paths of projections 29 of beam 14 so as to stop the machine when the trailer gives way after prolonged testing and the movement of beam 14 becomes excessively large. The electrical connection between limit switch and the power plant supplying fluid pressure for jacks 19, 20, are not shown because their nature is self-evident to persons skilled in the art.

Flexible high-pressure hoses 30, 31 have one of their ends connected respectively with the jacks 19 and 20. Their other ends are connected to a directional valve, such as a four-way solenoid valve, diagrammatically indicated at 32 in Fig. 3. Pressure fluid is circulated to valve 32 through conduits 33 connected to a high-pressure generator 34 driven by electro-motor 35. 36 indicates a pressure regulating valve, 37 a pressure gage, and 38 a cycle counter. Timers 39 energize valve 32 for the desired frequencies and durations. The system for actuating jacks 19, 20 by alternately supplying and withdrawing pressure fluid is illustrated diagrammatically only and will not be described in greater detail inasmuch as such systems and the component parts are well known and as the here important functions and purposes may be achieved by other means known per se.

Generator 34 by means of valve 32 alternately feeds pressure fluid to the jacks 19 and 20, respectively while relieving the pressure from the opposite jacks 20 and 19, respectively. This results in swiveling beam 14 about its pivot 15 thereby twisting the front end of trailer 4 alternately in counter-clockwise and in clockwise direction. A working stroke of 8" for jacks 19, 20 was found appropriate while the cycle of movements may vary and may for instance be between 15 to 30 cycles per minute.

The trailer is loaded for the testing in a manner similar to the loading intended for the trailer when in actual use by placing the load (not shown) on trailer floor 40, indicated by dotted lines in Figs. 1 and 2. Some trailers will therefore have a load of heavy material not extending all the way to the top while pressing against the side walls whereas other trailers will be tested with a load of lighter material which fills the entire interior and does not exert noteworthy pressures on the upright walls of the trailer. Loading the trailer for testing in a manner similar to the load in actual use is essential because the stresses exerted on the interior walls and their distribution are of great importance for obtaining valid test results.

The invention is not restricted, though primarily designed for testing of semi-trailers but may be used for testing other road vehicles which are subject to similar stresses, such as trucks or trailers provided with wheels of their own at both ends. Furthermore the invention is not restricted to specific details of equipment, stroke, frequency of alternating movement, etc., all of which have to be selected in accordance with equipment available on the market and the specific stresses to be investigated.

What is claimed is:

Method of structurally testing the bodies of semi-trailers and other road vehicles comprising the steps: of supporting the rear wheels of a vehicle on the ground; of loading the vehicle body directly; of supporting the front end of the vehicle movably about a horizontal axis extending in the longitudinal direction of the vehicle; of preventing the springs between the rear wheels and body from expanding and compressing; and of alternately forcing opposite sides of the front end upwardly thereby imparting twisting stresses to the vehicle body and simulating the stresses encountered by the vehicle when travelling over uneven roads.

References Cited in the file of this patent

UNITED STATES PATENTS

| | | |
|---|---|---|
| 1,921,320 | Palmer | Aug. 8, 1933 |
| 1,994,942 | Calkins | Mar. 19, 1935 |
| 2,072,019 | Atti et al. | Feb. 23, 1937 |
| 2,176,148 | Porter | Oct. 17, 1939 |